United States Patent
Chemouni et al.

(10) Patent No.: US 6,971,853 B2
(45) Date of Patent: Dec. 6, 2005

(54) ELASTOMERIC BEARING SYSTEM

(75) Inventors: Louis Chemouni, Woodland Hills, CA (US); Luigi Max Maggi, Long Beach, CA (US)

(73) Assignee: Barry Wright Corp., Wilmington, DE (US)

( * ) Notice: Subject to any disclaimer, the term of this patent is extended or adjusted under 35 U.S.C. 154(b) by 66 days.

(21) Appl. No.: 10/682,856

(22) Filed: Oct. 14, 2003

(65) Prior Publication Data

US 2005/0079055 A1    Apr. 14, 2005

(51) Int. Cl.$^7$ ............................................. B64C 27/35
(52) U.S. Cl. ................... 416/134 A; 416/141
(58) Field of Search ................ 416/134 R, 134 A, 416/135, 136, 141; 384/221, 271

(56) References Cited

U.S. PATENT DOCUMENTS 4,028,002 A * 6/1977 Finney et al. ........... 416/134 A
4,365,936 A * 12/1982 Hatch ..................... 416/134 A

* cited by examiner

Primary Examiner—Ninh H. Nguyen
(74) Attorney, Agent, or Firm—Clark & Brody

(57) ABSTRACT

An elastomeric bearing system capable of sustaining a high compressive load is adapted to connect the blades of a helicopter rotor to a rotor hub. The bearing system comprises first and second elastomeric bearing elements fixed at the opposite ends of a tie bar. Said first elastomeric bearing element comprises a rigid external housing having an internal truncated-tapered surface with its minor basis directed inwardly, a rigid internal housing having an external truncated-tapered surface with its minor basis directed inwardly, and a resilient body between said internal and external truncated-tapered surfaces. Said second elastomeric bearing element is constituted by a chevron sub-assembly, comprising two tapered elastomeric bearing elements disposed with their minor basis facing each other, both having an individual internal housing and a resilient body and sharing a common external housing with a double-taper internal surface, the internal housings being connected one another by fastening elements.

15 Claims, 3 Drawing Sheets

ELASTOMERIC BEARING SYSTEM

FIELD OF THE INVENTION

This invention relates generally to elastomeric bearings and more specifically to a bearing system capable of sustaining a high compressive load, thus allowing a pivot movement around an axis substantially perpendicular to said load. The invention can be applied, in particular, in a helicopter rotorhead to provide the blades with the flapping degree of freedom.

BACKGROUND OF THE INVENTION

A key component of a helicopter is the main rotor hub. It provides attachment of the main rotor blades during operation. Rotational power is delivered to the main rotor hub to provide rotational velocity to the blades in order to create aerodynamic lift. The main rotor hub must allow for rotational motion of the blades in the vertical (flap), horizontal (lead-lag), and axial (pitch) directions near the blade root attachment with the hub to accommodate flight control and dynamic stability regulation. Main rotor hub systems that accommodate these motions with discrete hinge mechanisms are referred to as fully articulated hubs. Throughout the improvements of the helicopter, it has been tried to provide rotational freedoms with bearing systems that can accommodate high loading and high amplitude oscillatory motion under high trust loading created by the centrifugal force of the rotating blades. In the past, complex mechanical balls or cylinder bearings have been used in order to provide the blade with the necessary degrees of freedom: such bearings require an expensive maintenance and are subject to sudden failure.

Developed in order to overcome these limitations, elastomeric bearings have become an industry standard for accommodating either lead-lag, or pitch, or flapping, or combined motions in articulated hub systems. These bearings are composed of a metal-elastomer laminated material that allows for shear compliance within the elastomer, and for rotational (e.g. flapping) freedom while reacting radial centrifugal force in compression. Such bearings reduce the mechanical complexity of the rotor head, are essentially maintenance-free, wear progressively and can be easily inspected in order to be replaced before failure.

Elastomeric conical bearings, known, for example, from U.S. Pat. No. 4,435,097, are used in bearing systems for helicopter rotor systems to accommodate rotor motion. The bearing systems are axially preloaded to prevent the conical bearing elements from experiencing an excessive resultant tensile stress within the rubber layers.

Currently, monodirectional, or "mono-bloc" bearing elements are employed at each attachment site of the main rotor hub, as it is clearly shown in FIG. 1 described hereafter.

U.S. Pat. No. 6,413,048 discloses a rotor hub using a pair of simple conical bearing for each rotor blade. Such a bearing has a very high radial stiffness and resistance to compressive radial loads, and at the same time it can easily accommodates a pivot movement around its axis, as it is desired in the present application. However, the rotor hub must provide the axial compression preload reaction, which induces a significant stress in its central body. When the bearing is heated, due to operational temperature increase and internal energy dissipation, the stress transmitted to the hub increases further, and this can be critical for the structure.

In order to overcome this major drawback of the simple conical bearing element, US. Pat. Application 2003/0068104 recited the use of preloaded bearing sub-assemblies constituted of a pair of conical elements disposed back-to-back (chevron bearing). That way, the preload and the extra load induced by the thermal expansion are entirely reacted inside the sub-assembly, and not transmitted to the rotor hub. However, as it is well known in rubber engineering, the stiffness of an elastomeric element and the strain induced by a given load depend on the so-called "shape factor", that is the ratio between the constrained area (where the elastomer is bonded to a metal layer) and the unconstrained (or "bulge") area. It is understood from document U.S. 2003/0068104 that the bulge area of a chevron is approximately double of that of a single conical bearing having the same envelope and constituted of an equivalent laminated elastomeric element differing only by its length (axial dimension), therefore its stiffness is consequently lower and the strain induced by the radial load increases significantly. As a consequence, the operational life of such bearings proves to be too short.

The present invention addresses the problem of providing a low maintenance elastomeric bearing system with a long operational life, thus overcoming the drawbacks of the above-described prior art.

SUMMARY OF THE INVENTION

An object of this invention is to provide an elastomeric bearing system comprising: a first and a second elastomeric bearing element fixed at the opposite ends of a tie bar, wherein said first elastomeric bearing element comprises a rigid external housing having an internal truncated-tapered surface, a rigid internal housing having an external truncated-tapered surface, and a resilient body between said internal and external truncated-tapered surfaces; and said second elastomeric bearing element is constituted by a chevron sub-assembly, comprising two opposed tapered elastomeric bearing elements, each having an individual internal housing and an individual resilient body, and having an external housing with a double-taper internal surface, the internal housings being connected one another by fastening elements.

The term "truncated-tapered" refers primarily to truncated-conical surfaces, but also, more generally, to surfaces having a curbed longitudinal cross-section and a shape substantially reminding that of a truncated cone. Such surfaces can be, for example, portions of spherical (or ellipsoidal) surfaces comprised between two parallels of the same hemisphere. The "tapered surfaces" need not have rotational symmetry.

In operational conditions, the external housing of each of said first and second elastomeric bearing element is fitted within a rigid support which can be, for example, the hub of a rotor.

Advantageously, the resilient bodies of said first and a second elastomeric bearing elements are constituted by a metal-elastomer laminated material.

Advantageously, the shear elasticity of said first and second elastomeric bearing elements allows a pivot movement of said tie bar around its own axis.

A typical requirement in helicopter application is that the amplitude of said pivot movement can attain a peak-to-peak amplitude of up to 30°.

As elastomers and laminated materials are more resistant to compression than to traction, said first and second elastomeric bearing elements are advantageously compressed by an axial preload, whose magnitude, in a preferred embodiment of the invention, is higher than 8,500 Pounds, and is advantageously comprised between 8,500 and 15,000 Pounds.

Advantageously, the load induced by thermal expansion of the elastomeric bodies of said second elastomeric bearing element is internally compensated by said fastening elements connecting said internal housings one another.

In order to take full advantage of the mechanical characteristics of the bearing system of the invention, during operation a radial force, oriented in a direction perpendicular to the axis of the tie bar, and a torque, perpendicular to both said axis of the tie bar and to said radial force, act on said tie bar, whereby said tie bar transmit a different radial load to said first and second elastomeric bearing elements, and wherein the radial load sustained by said first elastomeric bearing element is greater than that sustained by said second elastomeric bearing element.

In typical cases, the radial load sustained by said first elastomeric bearing element is comprised between 60,000 and 110,000 Pounds. The radial load sustained by said second elastomeric bearing element is comprised between 40% and 60% of the load sustained by said first elastomeric bearing element.

An axial force can also be applied to the tie bar and transmitted to said elastomeric bearings. The magnitude of said axial force is typically comprised between 3,000 and 9,000 Pounds.

Another object of the invention is a rotor hub assembly comprising: a hub center body; and a plurality of radially extending shafts, each of them relying one rotor blade to the hub center body; wherein each of those said radially extending shafts is connected to said hub center body by an elastomeric bearing system as previously described, mounted with said first elastomeric bearing element on the lead side and said second elastomeric bearing element on the lag side, whereby the radial load sustained by said first elastomeric bearing element is greater than that sustained by said second elastomeric bearing element.

BRIEF DESCRIPTION OF THE DRAWINGS

Additional features and advantages of the present invention will become apparent from the subsequent description, taken in conjunction with the accompanying drawings, which show.

DETAILED DISCLOSURE

Figure 1:
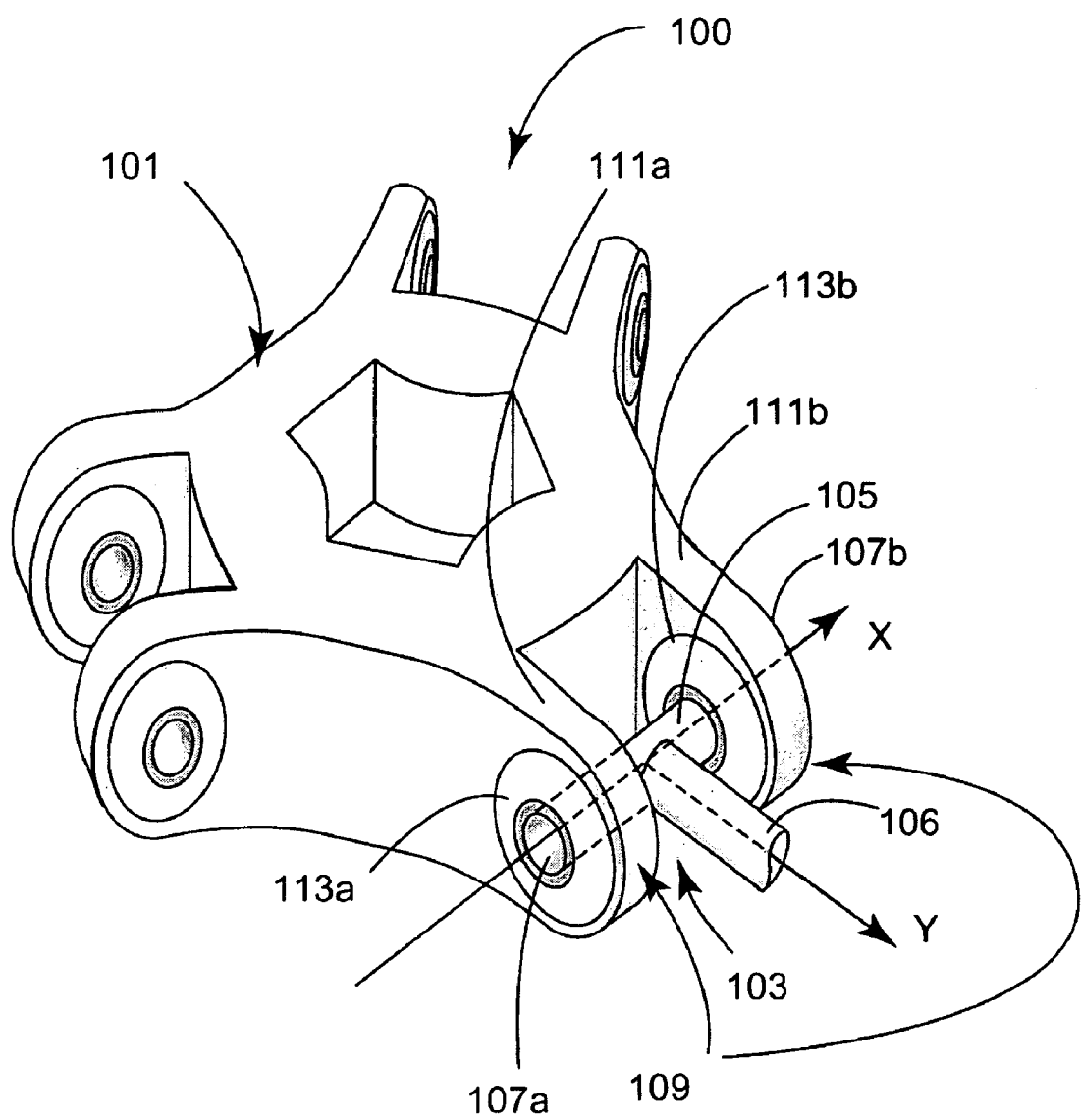
FIG. 1, an isometric view of an articulated hub assembly using elastomeric bearings.

FIG. 1 depicts an articulated hub assembly 100 that includes a plurality of rotor assemblies 103 radially attached to a hub center body 101; for a better clarity of the figure, only one rotor assembly is represented here. The articulated hub assembly 100 is designed to allow and to control the blades flap motion. Other bearings or bushings (not shown) are optionally used to allow pitch and lead-lag motion. The rotor assembly 103 includes a tie bar 105 carrying a radially extending shaft 106, which relies one rotor blade to the hub center body 101, usually through additional mechanical elements, such as the aforementioned bearings or bushings (not shown). The tie bar 105 is a substantially cylindrical shaped element having a pair of radially opposed journals 107a, b at both ends; each journal is designed to be fixed to the bearing mounting 109. The bearing mounting 109 includes two pair of radially extending bearing flanges 111a, b each containing an elastomeric bearing element 113a,b. The bearing elements have to sustain the centrifugal load in the Y direction, produced by the rotation of the rotor, allowing at the same time pivot movement around the X axis (flapping).

In the following, "bearing mounting" refers to the two bearing flanges 111a,b together with the corresponding bearing elements 113a,b, while "bearing system" refers to the two bearing elements 113a,b with the tie bar 105.

Figure 2:
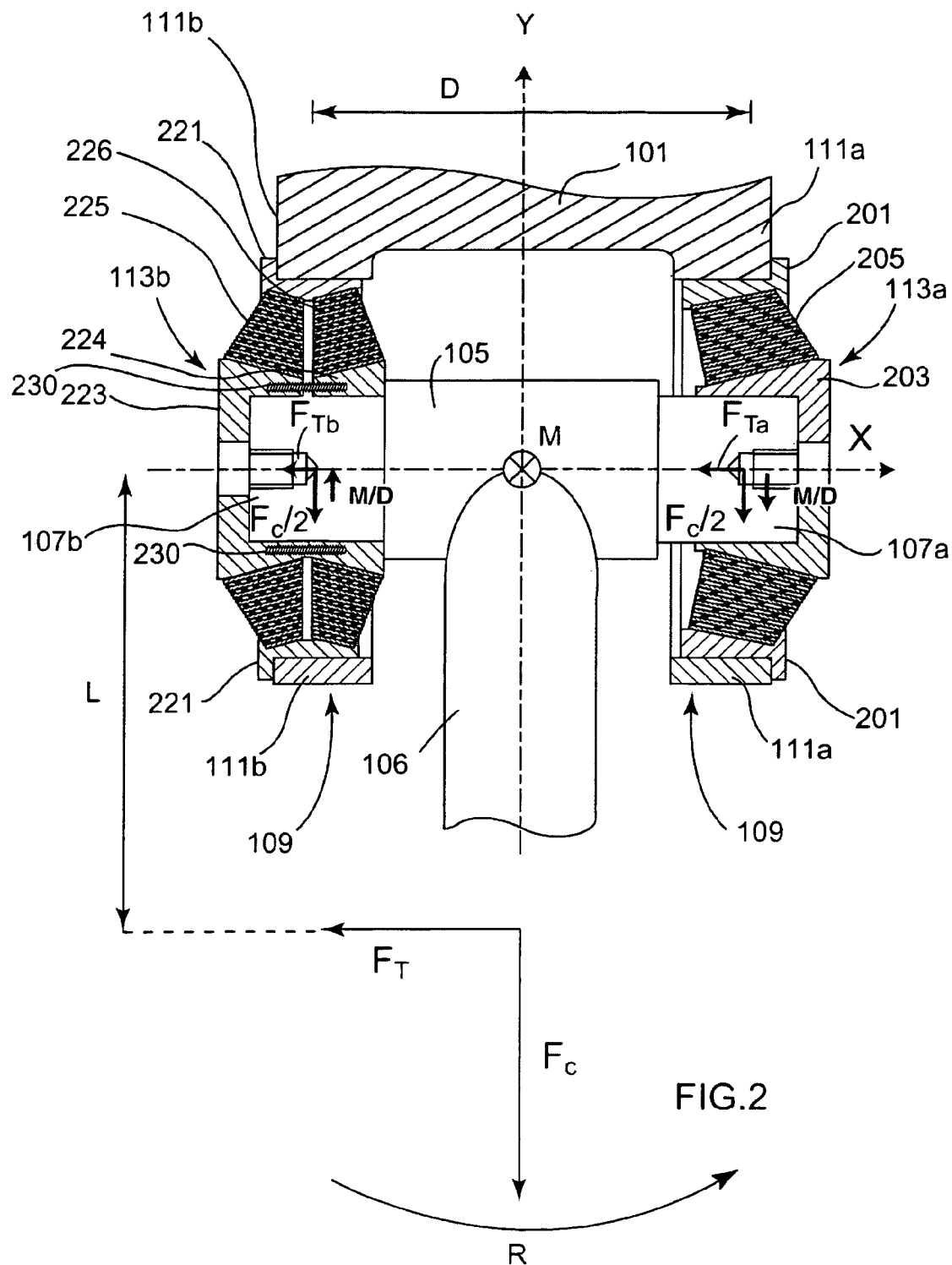
FIG. 2, a schematic view of an example of a bearing system according to the present invention.

FIG. 2 shows a section in the XY plane of the bearing mounting 109 of FIG. 1, realized according to the teaching of the present invention. Contrary to the prior art, bearing mounting 109 has an asymmetric structure: the lead-side bearing element 113a is of the simple conical type, while the lag-side bearing element 113b has a chevron design (arrow R indicates the rotation direction of the rotor). This is advantageous because the radial (Y) load is not the same on the two sides. As it is shown on the figure, the centrifugal force $F_c$ is, indeed, symmetrical, but aerodynamics laws and rotor design induce a torque M on the bearing mounting. This torque has the effect of increasing the radial load on the lead-side bearing 113a and to reduce that on the lag-side bearing 113b. A simple calculation shows that:

$$F_R^{lead} = F_c/2 + M/D$$

$$F_R^{lag} = F_c/2 - M/D$$

where $F_R^{lead}$ and $F_R^{lag}$ are the radial load on the lead- and lag-side bearing respectively and D is the distance between the elastomeric bearings.

The bearings must also sustain an axial load due to the air resistance to the rotation of the blades ($F_T$): this prevents the use of cylindrical bearings, which would not have a sufficient axial stiffness. The axial load on the lead-side (simple conical) bearing element is referenced in FIG. 2 as $F_{Ta}$ and that on the lag-side (chevron) bearing element as $F_{Tb}$; these loads can, in general, be different, depending on the axial stiffness of the bearing elements, and their sum is equal to $F_T$.

In conclusion, the overall compressive load is unevenly shared between two bearing elements: on the lag side it is less than it would have been expected if only the centrifugal force had been taken into account, as in the conventional design procedure. This allows the use, on that side, of a chevron bearing element, which reduces the stress on the rotor hub 101.

The simple conical bearing 113a is constituted by a rigid external housing 201 having an internal conical surface and secured to the bearing flange 111a, a rigid internal housing 203 having an external conical surface and fixed to the tie bar journal 107a, and a resilient body 205 between said internal and external conical surfaces. While the housings 201 and 203 are typically made of metal, e.g. steel, the resilient body is a laminated composite, constituted by a succession of conical layers of steel (or another metal) and rubber. The axial compressive preload (oriented along the positive direction of the X axis) is transmitted to the resilient body 205 through the flanges 111a,b and the tie bar 105. Thermal expansion of rubber induces a supplementary load that adds to the preloads and tends to bring the flanges 111a and 111b together.

The chevron sub-assembly 113b is composed by two conical elements disposed back-to-back with their minor basis facing each other, (the opposite arrangement is also possible), each having an individual internal housing (223 and 224) and an individual elastomeric body (225 and 226), and having an external housing 221 with a double-cone internal surface. The internal housings are connected one another by bolts 230, which can be used to apply an internal preload to the elastomeric bodies. In the case of the prior art document US. 2003/0068104 the preload is entirely internal, but in the present setup the chevron sub-assembly 113b is at least partially preloaded through the flanges 111a–b and the tie bar 105. The thermally induced load, however, is internally compensated for by bolts 230 and not transmitted to the hub 101.

Figure 3:
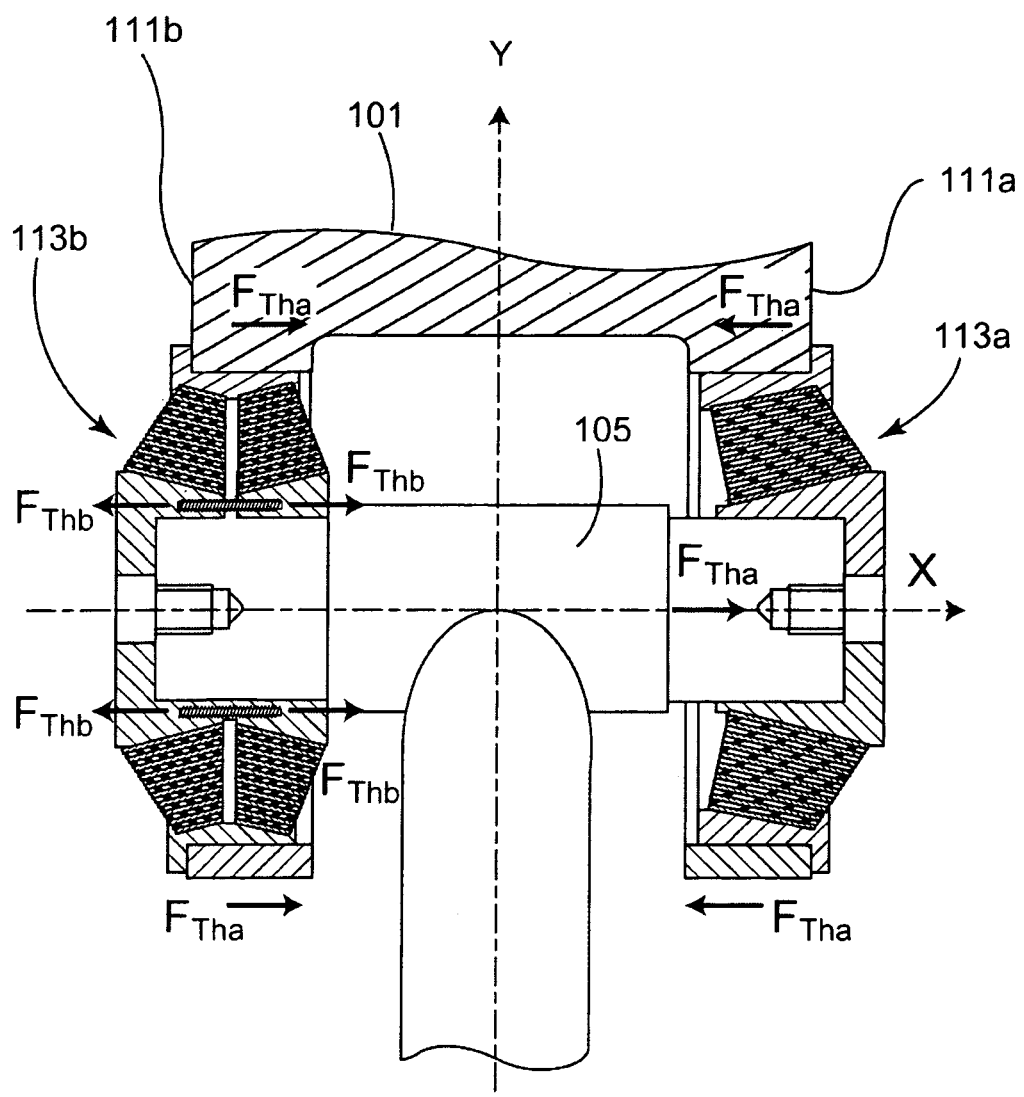
FIG. 3, the effect of thermal expansion on the bearing system of FIG. 2.

The effect of thermal expansion will be more easily understood with reference to FIG. 3. Thermal expansion of the elastomeric body of the conical bearing element 113a induces a load $F_{Tha}$ that is transmitted to the tie bar 105, which is put in traction, and to the flange 111a. The chevron bearing sub-assembly generates a thermal load $F_{Thb}$ that is approximately 40% lower than $F_{Tha}$, because of the lower stiffness of the chevron bearing compared to the simple conical one, but is internally compensated for. The load $F_{Tha}$ is transmitted through the tie bar 105 to the flange 111b: in conclusion, the force acting on each flange, and trying to bring them together, is equal to $F_{Tha}$ and is only due to the contribution of the conical bearing element 113a. The simple conical bearing element 113a could also have been mounted with the opposite orientation (with the minor basis of the internal casing directed outwardly). In this case, the preload and the thermal load would have been reversed.

The elastomeric bearing elements 113a and 113b are designed according to procedures known in the art in order to meet the requirements on radial, axial and torsion stiffness, on the life duration and on the maximal thermal load injected in the hub 101 by the conical bearing. In the present application the two elastomeric bearings, although of different types, must have stiffness properties near to each other.

For the sake of clarity, in the above description a particular rotor hub structure has consistently been considered. However, it is to be intended that the bearing system of the invention can be adapted to different rotor hub designs and to other application even outside the field of helicopters such as, for example, wind power generators. More generally, the teaching of the present invention can be advantageously applied in any mechanical structure, whenever it is necessary to provide a bearing system capable of sustaining a high compressive load unevenly shared between two bearing elements, thus allowing a pivot movement around an axis approximately perpendicular to said load, and particularly when thermal expansion is of concern.

In the above description, only bearings constituted by metal-elastomer laminated have been considered. It is to be intended, however, that the metal can be replaced by any other suitable stiff material, such a polymer (Kevlar®) or a ceramic. The same thing is true for the internal and external housing, the tie bar and the flanges.

The bearings have been described as "conical" in order to withstand an axial load, but this should not be interpreted in a strict geometrical sense. What is important is that the metal-elastomer layers are neither parallel to the tie bar (cylindrical bearings, having a low axial stiffness), neither perpendicular to it (in which case the bearings could not sustain a radial load). Bearings whose layers have a curbed longitudinal cross section, in particular constituting portions of spherical surfaces, still reminding the shape of a truncated cone, are encompassed by the general term "tapered bearings". The bearings can have rotation symmetry, as in the example discussed above: this means that the stiffness is the same in all the radial directions. However, in some applications, it might be useful to introduce an anisotropic behavior. For example, the envelope of a bearing can be constituted by the union of two 120° portions of a cylindrical surface: the result is a radial direction-dependent stiffness.

What is claimed is:

1. An elastomeric bearing system comprising:
    a first and a second elastomeric bearing element fixed at the opposite ends of a tie bar, wherein
    said first elastomeric bearing element comprises a rigid external housing having an internal truncated-tapered surface, a rigid internal housing having an external truncated-tapered surface, and a resilient body between said internal and external truncated-tapered surfaces; and
    said second elastomeric bearing element is constituted by a chevron sub-assembly, comprising two opposed tapered elastomeric bearing elements, each having an individual internal housing and an individual resilient body, and having an external housing with a double-taper internal surface, the internal housings being connected one another by fastening elements.

2. The elastomeric bearing system of claim 1, wherein the external housing of each of said first and second elastomeric bearing element is fitted within a rigid support.

3. The elastomeric bearing system of claim 2, wherein the rigid support is the hub of a rotor.

4. The elastomeric bearing system of claim 1, wherein the resilient bodies of said first and a second elastomeric bearing elements are constituted by a metal-elastomer laminated material.

5. The elastomeric bearing system of claim 1, wherein the shear elasticity of said first and second elastomeric bearing elements allows a pivot movement of said tie bar around its own axis.

6. The elastomeric bearing system of claim 5, wherein the amplitude of said pivot movement can attain a peak-to-peak amplitude of up to 30°.

7. The elastomeric bearing system of claim 1, wherein said first and second elastomeric bearing elements are compressed by an axial preload.

8. The elastomeric bearing system of claim 7, wherein the axial preload is 8,500 Pounds or higher.

9. The elastomeric bearing system of claim 1, wherein the loads induced by thermal expansion of the elastomeric bodies of said second elastomeric bearing element is internally compensated by said fastening elements connecting said internal housings one another.

10. A method of mounting an elastomeric bearing system, comprising:
    providing an elastomeric bearing system having a first and a second elastomeric bearing element fixed at the opposite ends of a tie bar, wherein said first elastomeric bearing element comprises a rigid external housing having an internal truncated-tapered surface, a rigid internal housing having an external truncated-tapered surface, and a resilient body between said internal and external truncated-tapered surfaces and said second elastomeric bearing element is constituted by a chevron sub-assembly, comprising two opposed tapered elastomeric bearing elements, each having an individual internal housing and an individual resilient body, and having an external housing with a double-taper internal surface, the internal housings being connected one another by fastening elements; and mounting the elastomeric bearing system at a location wherein a radial force ($F_c$), oriented in a direction perpendicular to the axis of the tie bar, and a torque (M), perpendicular to both said axis of the tie bar and to said radial force, act on said tie bar during operation, whereby said tie bar transmit a different radial load to said first and second elastomeric bearing elements, and wherein the radial load sustained by said first elastomeric bearing element is greater than that sustained by said second elastomeric bearing element.

11. Mounting according to claim 10, wherein the radial load sustained by said first elastomeric bearing element is comprised between 60,000 and 110,000 Pounds.

12. Mounting according to claim 10, wherein the radial load sustained by said second elastomeric bearing element is comprised between 40% and 60% of the load sustained by said first elastomeric bearing element.

13. Mounting according to claim 10, wherein an axial force ($F_T$) is also applied to the tie bar and transmitted to said elastomeric bearings.

14. Mounting according to claim 13, wherein the magnitude of said axial force ($F_T$) is comprised between 3,000 and 9,000 Pounds.

15. A rotor hub assembly comprising:
a hub center body; and
a plurality of radially extending shafts, each of them relying one rotor blade having a lead side and a lag side to the hub center body;
wherein each of those said radially extending shafts is connected to said hub center body by an elastomeric bearing system according to any of claims 1 to 10, mounted with said first elastomeric bearing element on the lead side and said second elastomeric bearing element on the lag side, whereby the radial load sustained by said first elastomeric bearing element is greater than that sustained by said second elastomeric bearing element.

* * * * *